United States Patent [19]

Dean et al.

[11] 4,415,438
[45] Nov. 15, 1983

[54] METHOD FOR CATALYTICALLY CONVERTING RESIDUAL OILS

[76] Inventors: Robert R. Dean, #1 Columbine La., Littleton, Colo. 80123; Warren S. Letzsch, 6533 S. Kearney Cir., Englewood, Colo. 80111; Jean L. Mauleon, 15656 E. Grand Ave., Aurora, Colo. 80112

[21] Appl. No.: 324,450

[22] Filed: Nov. 24, 1981

[51] Int. Cl.³ .............................................. C10G 11/05
[52] U.S. Cl. ................................ 208/120; 502/68.79; 585/487
[58] Field of Search ...................... 208/120, 9, 15, 46, 208/164, 130, 160, 161; 585/487

[56] References Cited

U.S. PATENT DOCUMENTS

| | | | |
|---|---|---|---|
| 3,293,192 | 12/1966 | Maher et al. | 252/430 |
| 3,402,996 | 9/1968 | Maher et al. | 252/455 Z |
| 4,200,520 | 4/1980 | Gladrow et al. | 208/120 |
| 4,239,654 | 12/1980 | Gladrow et al. | 208/120 X |
| 4,242,237 | 12/1980 | Gladrow et al. | 208/120 X |
| 4,287,048 | 9/1981 | Gladrow et al. | 208/120 |
| 4,289,606 | 9/1981 | Gladrow et al. | 208/120 |
| 4,331,533 | 5/1982 | Dean et al. | 208/113 |
| 4,332,674 | 6/1982 | Dean et al. | 208/120 |
| 4,336,160 | 6/1982 | Dean et al. | 208/120 X |

*Primary Examiner*—Delbert E. Gantz
*Assistant Examiner*—G. E. Schmitkons
*Attorney, Agent, or Firm*—Carl D. Farnsworth

[57] ABSTRACT

A process for converting residual oil comprising vacuum bottoms in the presence of a cracking catalyst of high surface area and comprising an ultrastable zeolite is described. More particularly, a conversion process particularly contributing to producing cycle oil and gasoline boiling range products with reduced carbon deposition in combination with a relatively high regeneration temperature operation of at least 1350° F. and above, and a short contact time riser hydrocarbon conversion operation contributing to reducing slurry oil product in favor of lower boiling products is described. A fluid cracking catalyst comprising a special ultrastable crystalline zeolite of high silica to alumina ratio provides hydrothermal stability of acceptable tolerance in the environment employed.

17 Claims, 1 Drawing Figure

Unit cell contraction in ultrastable zeolites

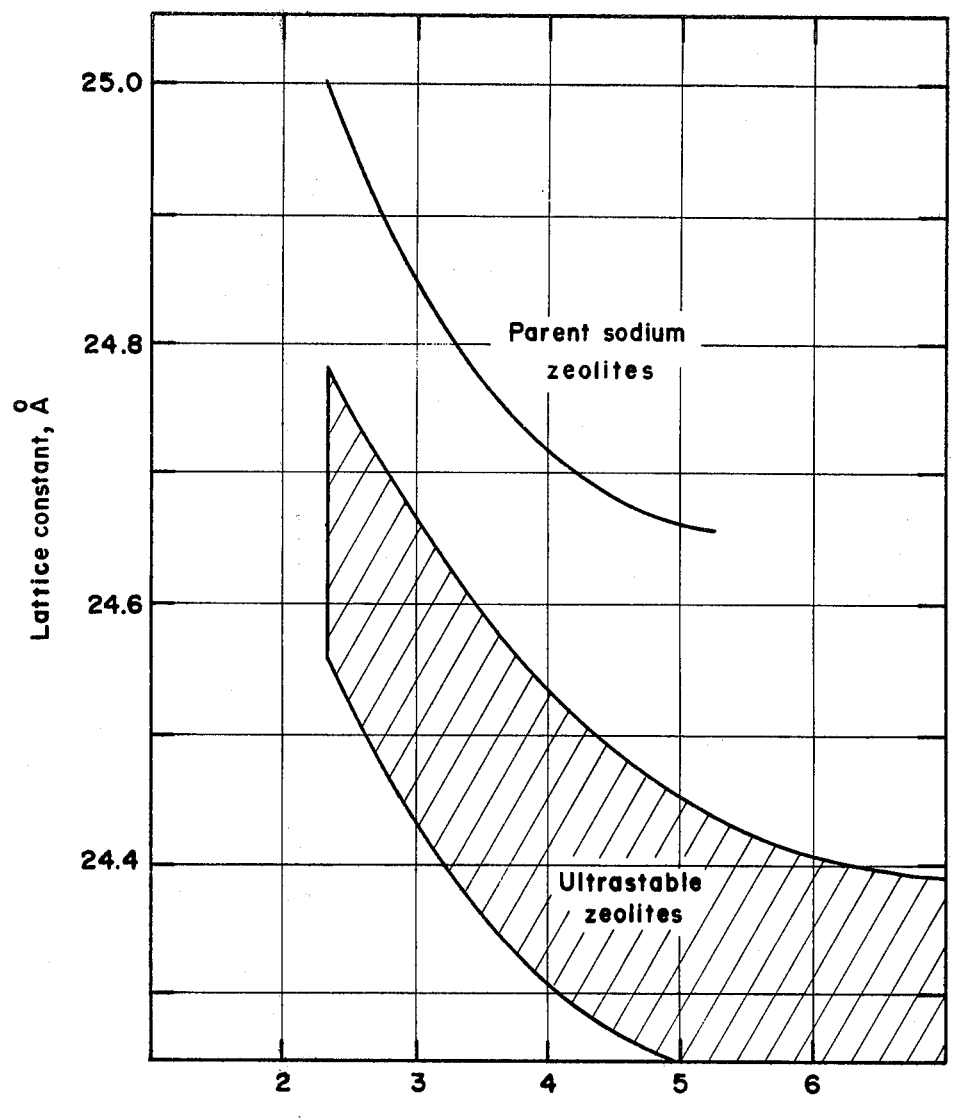
Unit cell contraction in ultrastable zeolites

METHOD FOR CATALYTICALLY CONVERTING RESIDUAL OILS

BACKGROUND OF THE INVENTION

Fluid catalytic cracking has undergone many changes since its inception in the early 1940's. One of the recent process advances in fluid catalytic cracking has been the advent of zeolite catalysts usage which has prompted many process design modifications. Feedstocks, however, have changed very little up to recent years, being comprised of mostly atmospheric and vacuum gas oils. However, with the economic need of the industry to process poorer quality crude oils, and a need at the same time to maintain high gasoline yields, the ability to effect conversion of poor quality feed stocks in a FCCU process is now of significant importance.

The present invention is directed to extending the processed boiling range of crude oil feedstocks to include substantially all of the atmospheric bottoms, a residual or reduced crude portion thereof and comprising vacuum tower bottoms by catalytically cracking such materials in a selective process more fully discussed below that converts a highly atomized-vaporized mixture of the feed components at a relatively high temperature with an ultrastable crystalline zeolite catalyst herein identified.

U.S. Pat. No. 4,287,048 particularly identifies an ultrastable "Y" type crystalline zeolite and its method of preparation in the following manner. "Stabilized" or ultrastable Y-type zeolites are well-known. They are described, for example, in U.S. Pat. Nos. 3,293,192 and 3,402,996 and the publication Society of Chemical Engineering (London) Monograph Molecular Sieves, page 186 (1968) by C. V. McDaniel and P. K. Maher, the teachings of which are hereby incorporated by reference. In general, "ultrastable" refers to a Y-type zeolite which is highly resistant to degradation of crystallinity by high temperature and steam treatment and is characterized by a $R_2O$ content (wherein R is Na, K or any other alkali metal ion) of less than 4 weight percent, preferably less than 1 weight percent and a unit cell size less than 24.5 Angstroms and a silica to alumina mole ratio in the range of 3.5 to 7 or higher. The ultrastable form of Y-type zeolite is obtained primarily by a substantial reduction of the alkali metal ions and the unit cell size reduction. The ultrastable zeolite is identified both by the smaller unit cell and the low alkali metal content in the crystal structure.

As is generally known, the ultrastable form of the Y-type zeolite can be prepared by successively base exchanging a Y-type zeolite with an aqueous solution of an ammonium salt, such as ammonium nitrate, until the alkali metal content of the Y-type zeolite is reduced to less than 4 weight percent. The base exchanged zeolite is then calcined at a temperature of 1000° F. to 1500° F., for up to several hours, cooled and thereafter again successively base exchanged with an aqueous solution of an ammonium salt until the alkali metal content is reduced to less than 1 weight percent, followed by washing and calcination again at a temperature of 1000° to 1500° F. to produce an ultrastable zeolite Y. The sequence of ion exchange and heat treatment results in the substantial reduction of the alkali metal content of the original zeolite and results in a unit cell shrinkage which is believed to lead to the ultra high stability of the resulting Y-type zeolite. The particle size of the zeolites is usually in the range of 0.1 to 10 microns, more particularly in the range of 0.5 to 3 microns.

Suitable amounts of the ultrastable Y-type zeolite in the catalyst of the present invention include from about 10 to about 80 weight percent, preferably from about 30 to about 50 weight percent, based on the total catalyst.

SUMMARY OF THE INVENTION

The catalytic cracking or conversion of heavy oil feeds comprising atmospheric tower bottoms vacuum gas oils plus resid, residual oil, reduced crudes, and topped crudes, shale oil, coal liquefaction oil products and tar sands oil products all of which comprise components boiling above 1000° F. or 1050° F. are best catalytically converted in a highly vaporized-atomized contact phase of the oil feed with select fluid catalyst particles of a composition herein identified. The heat necessary to substantially completely vaporize-atomize all of the high boiling oil feed is contributed by a relatively high regenerator temperature operation of at least about 1350° F. and preferably above 1400° F. completed in the substantial absence of hydro-thermal damage to the catalyst. The more conventional zeolite cracking catalysts comprising relatively large amounts of one or more rare-earth exchanged faujasite zeolites are susceptible to considerable hydro-thermal deactivation under high temperature regeneration conditions above about 1400° F. and required to remove relatively large amounts of hydrocarbonaceous materials deposited during residual oil cracking operations.

It is observed through commercial experience of catalytically cracking heavier and heavier feed stocks that there is a marked tendency for the regenerator temperature to rise to higher levels as the quality of the feed stock deteriorates. (Heavier and lower quality feed stocks for the purposes of this discussion refers to the inclusion of high boiling residual oils of high Conradson carbon in the feed).

It is also observed that if the regenerator temperature is restrained by means not usually employed in conventional gas oil cracking such as providing steam coils in the regenerator, external catalyst coolers and/or other means employed by some operators, the selectivity of the hydrocarbon conversion reaction shifts in the direction of producing undesirable large amounts of coke and liquid products referred to as "cycle oils". Cycle oils are liquid products comprising large quantities of condensed ring aromatics. The condensed ring aromatics are two, three, four and larger six carbon member rings. The cycle oils comprising largely two member rings referred to as light cycle oils (LCO) are commercially marketable as middle distillate. Cycle oils comprising largely three and a greater number of condensed rings such as found in some heavy cycle oils and particularly slurry oils are of low commercial worth and are usually only marketed as bunker fuel.

On the other hand, it is observed in commercial catalytic cracking of the heavier feed stocks comprising residual oils that if the tendency for the regenerator temperature to rise to a higher level is not restrained then the undesirable reaction to selectivity described above does not occur. That is, at higher regenerator temperatures and at temperatures generally above those employed commercially for gas oil cracking, above 1350° F., coke production is equal to or lower than that observed in conventional gas oil cracking, and the production of condensed ring aromatics larger than two member rings is discouraged.

It is observed in a study of catalysts suitable for converting high boiling residual oils, that contrary to many of the teachings in the prior art, a high surface area crystalline zeolite such as an ultrastable crystalline zeolite, commercially identified by Davison Chemical Co. as Z-14US, is a highly stable and effective conversion catalyst at the high regeneration temperatures required when processing high boiling residual oil type feeds despite its relatively low fresh catalyst activity. More importantly, when the processing concepts of this invention are pursued, it is further observed that the high surface area ultrastable crystalline zeolite contributes to a significant reduction in deposition of hydrocarbonaceous material, improves light cycle product yield at the expense of heavier cycle oils and provides a product selectivity generally richer in gasoline and gasoline forming components than is achieved with a more conventional rare-earth exchanged zeolite such as CREY at comparable fresh feed conversion levels.

It is further observed that the commercially available high activity zeolitic catalysts comprising rare earth exchanged zeolites, experiences a serious surface area decline. This surface area decline is viewed to be due to hydro-thermal instability under the conditions of the preferred unit operating mode. As the surface area progressively decays, it is further observed that product selectivity shifts in the direction of increased heavy cycle oil production and particularly cycle oils of ring structures greater than 2 member rings, increased gas production comprising $H_2$, $C_1$'s and $C_2$'s and more importantly a reduced gasoline production.

The outer or exterior surface such as provided by a high surface area ultrastable zeolite is found to be very effective in providing accessible and available active cracking sites to affect the now experienced substantial molecular weight reduction of high molecular weight components in a slurry oil to more desirable lower molecular weight components. The hydrothermal stability of an ultrastable crystalline zeolite catalyst prepared as herein identified and briefly discussed is found to be superior to that of a rare-earth exchanged "Y" faujasite referred to as CREY and used to form catalyst particles for cracking hydrocarbon feed materials. The ultrastable zeolite containing catalysts maintain significantly higher surface areas equilibrium catalysts at high regeneration temperatures than obtained with a CREY catalyst. A matrix or base material with a relatively high amorphous surface area which provides active cracking sites may be employed with the ultrastable zeolite in lieu of more catalytically inert matrix materials and contribute to the cracking of high boiling cycle oil components obtained in a reduced crude cracking operation. However, unlike cracking with an amorphous cracking catalyst, the ultra stable hydrogen form of zeolite herein discussed do the desired cracking or conversion of high molecular weight hydrocarbon components with a substantial reduction in coke and gas production. This observed difference in product selectivity when employing an ultrastable crystalline zeolite in lieu of CREY for reduced crude cracking is unexpected and not previously predictable. Thus the cracking of high boiling residual oils comprising metallo-organic components boiling above 1025° F. benefits in several significant ways herein identified when employing the ultrastable form of crystalline zeolites in catalyst compositions providing high surface area particle compositions.

It is, therefore, concluded that to more successfully crack high boiling range feed stocks comprising residual oil of high Conradson carbon value and to obtain desired product selectivity requires at least two fundamental operation conditions:

1. High regenerator temperatures which means a high catalyst temperature at the point of oil catalyst contact.
2. A high surface area catalyst that can maintain a high surface area exceeding that obtainable with CREY containing catalysts under the conditions of high, above 1400° F., regeneration temperatures.

A catalyst composition satisfying the above operating parameters and found to be suitable for the specific conversion of high boiling residual oil containing feed stocks is a catalyst comprising an ultrastable crystalline zeolite as herein described. This particular crystalline zeolite, sieve or crystalline aluminosilicate is industrially referred to as an ultrastable sieve or crystalline zeolite. Compared to the state of the art rare earth exchanged zeolite (CREY) containing catalyst, the ultrastable sieve containing catalyst is of a relatively low activity but high surface area catalyst as measured in the fresh catalyst state. This catalyst is described in various patents briefly referred to herein. The ultrastable zeolite containing catalysts have been discussed in the literature for application in the more conventional clean feed gas oil cracking operations but because of its low relative activity compared to rare earth containing zeolites and relatively high cost has not received industry acceptance. However, it has been found that when applied to residual oil cracking operations, the ultrastable zeolite catalyst becomes superior catalysts, by providing and producing a profound improvement in cracking selectivity over the state of the art higher activity rare earth exchanged zeolite containing catalyst. This is illustrated in the commercial results presented in Table I, wherein cracking data is presented comparing performance of the ultrastable sieve containing catalyst to a rare earth exchanged zeolite containing catalyst.

The drawing is a graphical representation of the contraction of an ultrastable crystalline zeolite obtained during calcination under different temperature conditions. It is observed that this contraction is substantially less than that obtained when subjecting a CREY catalyst composition to similar conditions.

DISCUSSION OF SPECIFIC EMBODIMENTS

A class of zeolite containing catalysts particularly suitable for use in the residual oil conversion process of this invention is one comprising an ultra stable crystalline zeolite commercially identified as Z-14US. The preparation of an ultrastable crystalline zeolite discussed above is described in U.S. Pat. No. 4,287,048, and referenced material including U.S. Pat. Nos. 3,293,192 (1966) and 3,402,966, the subject matter of which is incorporated herein by reference.

The ultrastable sieve or crystalline zeolite described in the above identified referenced material and U.S. patents are characterized by a significant (1–1.5%) decrease in the unit cell dimensions of the parent sodium zeolite. This contraction is caused by extraction of aluminum cations from the crystalline zeolite in the manufacturing process. This has been shown to be true by McDaniel and Maher in their book entitled "Zeolite Chemistry and Catalysis", page 320 by FIG. 17 and reproduced for inclusion herewith as the drawing. In this drawing the shaded area identifies the unit cell contraction area for ultrastable zeolites of different silica to alumina ratio.

To be a suitable ultrastable crystalline zeolite component of the catalyst for use in the process of this invention, the zeolite $SiO_2/Al_2O_3$ ratio is greater than 3 and the unit cell size or lattice constant is less than 24.65 Angstroms. In a particular embodiment, the ultrastable zeolite will have a $SiO_2/Al_2O_3$ ratio of at least 5 with a unit cell size of about 24.5 Angstroms or less. A high sodium content zeolite, matrix components and residual oil feed are known to deactivate a cracking catalysts zeolite crystalline structure relativity rapidly so it is important to reduce the sodium content of these materials and particularly the finished zeolite sodium content to at least 1 weight percent or less. Various techniques for achieving this low sodium content are discussed in the literature. Preferably the residual $Na_2O$ on the zeolite structure is below 0.5 weight percent.

The cracking activity level of an ultrastable crystalline zeolite is less than a rare earth exchanged zeolite such as CREY. Thus it requires considerably more ultrastable zeolite than CREY to form catalyst particles of the same degree of activity. This high addition has been considered heretofore as not suitable for use in hydrocarbon conversion operations of lower regenerator temperatures.

Modern high activity FCC catalysts are reported to contain in the range of 15-40% of a rare-earth type Y zeolite. In a conventional rare-earth zeolite catalyst employed in an FCC unit processing gas oils and operating with regenerator temperatures generally maintained below 1400° F. and more usually not above 1350° F. or less requires using for the same activity level an ultrastable crystalline zeolite catalyst comprising from 60-160% of the ultrastable zeolite. Obviously, no catalyst could contain more than 100% of any component. A catalyst particle of such high zeolite content presents formidable problems to the catalyst suppliers and manufacturer to produce such a catalyst composition with suitable physical attrition resistant or hardness properties for use in a circulating fluid catalytic cracking system.

At relatively high regenerator temperatures in the range of 1350° F.–1600° F. and required in the high temperature conversion of residual oils an ultrastable crystalline zeolite catalyst obtained as above provided is found to give an equilibrium activity that is equal to or exceeds that of a rare-earth type Y sieve (CREY) containing catalyst and provides a higher equilibrium surface area without encountering undesired coke and liquid product selectivity as herein identified. It has also been found that at a high oil feed—catalyst suspension mix temperatures at least equal to the pseudo critical temperature of the feed and characterized by regenerated catalyst temperatures at or above 1350° F. the heavy or high boiling multi ring components in the oil feed are more readily converted thermally and catalytically to lower boiling desired products by the high surface area ultrastable zeolite catalyst in modern catalytic cracking facilities.

A commercial test of the ultrastable hydrogen form of crystalline zeolite containing catalyst herein identified provides the data shown in Table I. In this operation where the regenerator was operating over 1400° F., the ultrastable zeolite containing catalyst actually outperformed a CREY catalyst. That is, lower coke yields were observed and there is a substantial drop in the heavy cycle oil yield and its gravity. Extra light cycle oil and gasoline is produced at the expense of coke and heavy cycle oil with liquid $C_3$ plus yield increased significantly and all factors resulting in economic gain.

TABLE I

| COMMERCIAL CRACKING PERFORMANCE | | |
|---|---|---|
| Type Zeolite in Catalyst* | Z-14US** | C-RE-Y |
| CAT ADDN's #/Bbl. FEED | .34 | .4 |
| FEED RATE, B/D | 18,070 | 18,000 |
| FEED CON. CARBON, Wt. % | 2.5 | 2.5 |
| Rx. TEMP. °F. | 982 | 974 |
| REGEN. DENSE PHASE TEMP. °F. | 1,413 | 1,402 |
| CONVERSION, VOL. % | 80.8 | 80.1 |
| $C_2$ - YIELD, SCFB | 312 | 324 |
| ALKY FEED, VOL. % ($C_3$-$C_4$) | 26.7 | 26.1 |
| GASOLINE, VOL. % | 58.1 | 55.7 |
| LCO, VOL. % | 12.8 | 10.1 |
| SLURRY, VOL. % | 6.4 | 9.8 |
| TOTAL LIQUID YIELD $C_3$ + VOL. % | 104.0 | 101.7 |
| COKE, Wt. % | 5.6 | 6.4 |
| MICRO ACTIVITY | 60 | 70 |
| CATALYST SURFACE AREA $M^2$/gm | 105 | 65 |

*Catalysts contained approximately same amount of zeolite promoter (Wt. basis) when new.
**Z-14US refers to ultra-stable zeolites.

The reduction in heavy cycle oil product and increased light cycle oil product obtained as above-identified was surprisingly unexpected when compared to the results obtained with a rare-earth exchanged crystalline zeolite (CREY) containing catalyst. Both forms of zeolite catalysts were supported by a relatively inactive matrix material. The increase in equilibrium surface area indicates that substantially more zeolite is present in the equilibrium catalyst comprising the ultrastable hydrogen form zeolite containing catalyst.

TABLE II

| Catalyst Sieve Type | US | RE-Y |
|---|---|---|
| Matrix Type | Low surface Area/Activity | |
| Equil. S.A. | 105 | 65 |

The large surface area of the ultrastable zeolite is apparently very effective in providing active accessible cracking sites to cause the experienced molecular weight reduction in the slurry oil. Unlike cracking with amorphous cracking catalysts, it is observed that the ultrastable hydrogen zeolites do this cracking with less or a lower coke and gas production. The data provided in Table I clearly indicates that the equilibrium activities of the two catalysts, ultrastable zeolite and rare earth exchanged zeolite, after exposure to regenerator temperatures of about 1400° F., were quite similar in activity even though the CREY catalyst started with 3-4 times the activity of the ultrastable zeolite catalyst. At even higher regenerator temperatures, the benefits obtained by using the ultrastable catalyst are expected to be even greater.

The following conclusions are reached in view of the above with respect to the fluid catalytic cracking of residual oil with an ultrastable crystalline zeolite catalyst.

1. High catalyst temperatures at point of oil catalyst contact, vis-a-vis, high regenerator temperatures are necessary to more completely vaporize the high boiling residual oil feed stock.
2. Failure to adequately vaporize-atomize the feed encourages poor cracking selectivity i.e., encourages high coke make, high cycle oil production, particularly cycle oils rich in ring structures greater than 2 member rings, high gas make and low gasoline production. The poor performance attributed when the feed is inadequately vaporized is likely due to the "coke shut off" of the active catalyst sites by the portion of the feed not vaporized.

3. As the residual oil content of the feed stock increases the catalyst high temperature at point of oil contact (vis-a-vis high regenerator temperature) must be permitted to rise to a higher optimum level in order to encourage more nearly complete vaporization of the feed if undesirable cracking selectivity is to be avoided.
4. Utilization of catalysts containing rare earth exchanged zeolites is inconsistent with high temperature regeneration despite their inherent relatively high initial activity, because of rapid surface area decay and rapid loss of activity in high temperature regeneration environment.
5. Ultrastable sieve or crystalline zeolite containing catalysts despite their relatively low fresh catalyst activity equilibrate in a commercial cracking process when cracking residual oil at desired high temperature conditions at acceptable catalyst activity levels and retain a desired high surface area. This high surface area equilibrium leads to desirable cracking selectivity i.e., high yields of gasoline and gasoline forming components, increased yields of cycle oils containing two member rings produced at the expense of cycle oils containing higher member rings with substantially less coke make and a reduced gas production.

The ultrastable zeolite may be supported by any one of a different member of support materials or matrices. For example, matrices other than an inactive kaolin-clay silicon oxide binder combination can be used to hold or include the ultrastable hydrogen exchanged crystalline zeolite. In fact, any of the known prior art or conventional catalyst matrix materials can be used. Such materials would include synthetic silica-alumina, clay, silica or alumina binders or any combination thereof. The finished catalyst will preferably contain not less than 20 wt % or more than 80% of an ultrastable hydrogen form of crystalline zeolite herein identified.

The ultrastable crystalline "Y" zeolite catalyst preferably employed by this invention for cracking high boiling residual oils may be used however, in conjunction with a metal entrapment material or metals sink for accumulation thereof. The finished catalyst will preferably contain not less than 20 wt % or more than 80% of an ultrastable hydrogen form of crystalline zeolite herein identified.

The catalytic cracking or conversion of high boiling hydrocarbons comprising Conradson carbon producing materials are best catalytically converted in a highly vaporized-atomized condition during contact with the high surface area zeolite containing catalyst herein particularly defined by employing contact temperature conditions provided by hot regenerated catalyst at least equal to the feed pseudo-critical temperature. Thus the catalyst regeneration temperature will increase above 1350° F. during combustion of deposited carbonaceous material as the residual oil feed Conradson carbon value increases even though the ultrastable zeolite catalyst composition employed in the conversion process of this invention contributes to a reduction in coke make. Thus when processing vacuum gas oils comprising the resid portion of the crude oil, regeneration temperatures above 1350° F. and up to as high as 1600° F. or more can be experienced as carbonaceous deposits increase in response to the feed Conradson carbon content.

The catalytic conversion operation of this invention is preferably one of relatively short vaporized hydrocarbon contact with the special catalyst composition comprising from 20 to 80 wt % of ultrastable crystalline zeolite as a dispersed catalyst phase in a riser contact zone wherein the hydrocarbon residence time in contact with catalyst particles can be restricted to within the range of 0.5 to 5 seconds and more usually in the range of 1 to 3 seconds. This dispersed catalyst phase-vaporized hydrocarbon contact may be implemented in substantial measure by the use of an atomizing diluent material with the high boiling hydrocarbon feed. Diluent materials suitable for this purpose include steam, $CO_2$, light normally gaseous hydrocarbons comprising $C_3$ minus material or a combination thereof in an amount which will reduce the high boiling feed partial pressure and achieve desired atomized-vaporized dispersion contact of hydrocarbon feed with high temperature catalyst particles. Atomization of the feed may be substantially implemented by use of appropriate spray nozzles. Thus the operating parameters to achieve an optomized contact between feed and catalyst particles also include feed exit velocities in excess of 10 feet per second to achieve atomized spraying of the feed with or without diluent material across a riser reactor cross section for intimate contact with hot catalyst particles charged thereto.

The above identified operating parameters are intended to also accelerate the mixture relatively uniformly within the feed vaporization section of a riser reactor in a minimum time frame and thus enhance rapid heat transfer from hot catalyst particles to charged feed preferably atomized and thus prevent localized enhanced catalyst to oil ratios contributing to a dense catalyst bed phase. That is, the operating conditions and methods for implementing are selected to ensure a relatively dilute phase suspension contact between catalyst particles and atomized oil feed for vaporized conversion transfer through a riser conversion zone. Such dilute catalyst phase operations include catalyst particle concentrations in the range of 2 to 10 pounds per cubic foot and preferably not above about 5 pounds per cubic foot.

The catalyst hydrocarbon feed suspension formed as above provided is passed through a riser contact zone for a hydrocarbon contact time less than about 5 seconds before discharge therefrom at a temperature sufficiently elevated to maximize recovery of vaporized hydrocarbon material separately from catalyst particles.

In a more particular and specific aspect the present invention is directed to the catalytic conversion of high boiling residual oils comprising vacuum gas oils containing high boiling Conradson carbon producing materials employing a special ultrastable crystalline zeolite containing catalyst at a temperature equal to or above the feed pseudo-critical temperature in preferably a riser contact zone for a hydrocarbon residence time in the range of 0.5 to about 5 seconds and more usually not above about 3 seconds.

Thus as the end boiling point of the hydrocarbon feed or the Conradson carbon level thereof increases so also will the catalyst regeneration temperature generally increased in response to increased deposited carbonaceous material removed by combustion and contributing to high temperature regeneration and conversion of the feed according to the concepts of this invention. However, as discussed above, employing the ultrastable zeolite catalyst provides a lower coke yield than obtained with the rare earth zeolite catalyst thus contributing measurably to the advantages of the processing concepts of this invention as herein described.

Depending on the feed hydrocarbon to be converted, its boiling range and Conradson carbon contributing factor, the hydrocarbon conversion operation may be effected at a temperature in the range of 950° F. up to about 1400° F. or at a temperature equal to or above the feed pseudo-critical temperature employing a reactor pressure from about atmospheric pressure up to about 100 psig but generally not above about 50 psig.

The riser cracking operation of this invention may be employed in conjunction with the catalyst regeneration arrangement of copending application Ser. No. 169,086, filed July 15, 1980 (now U.S. Pat. No. 4,332,674), the subject matter of which is incorporated herein by reference thereto. That is, the apparatus and operating concepts of the above identified application and the methods of implementation except as particularly modified by employing an ultrastable crystalline zeolite containing catalyst, as herein provided, may be employed with considerable advantage in protecting the activity and selectivity characteristics of the ultrastable crystalline zeolite catalyst particularly when reducing residual coke on the ultrastable zeolite catalyst to less than about 0.25 wt. %.

Having thus generally described the method and concepts of this invention and discussion specific embodiments in support thereof, it is to be understood that no undue restrictions are to be imposed by reasons thereof except as defined by the following claims.

We claim:

1. A method for upgrading a residual oil portion of crude oil boiling above 600° F. comprising metalloorganic compounds which comprises contacting said residual portion of crude oil boiling above 600° F. with a catalyst consisting of from 20 to 80 wt. % of an ultrastable faujasite crystalline zeolite dispersed in a silica-clay matrix for a time at a temperature particularly selective for conversion of the residual portion of crude oil to products of gasoline, light cycle oil and gasoline forming gaseous components, and recovering said products comprising gasoline and light cycle oil.

2. The method of claim 1 wherein the cycle oil comprises two member rings produced at the expense of producing of cycle oils of higher member rings.

3. The method of claim 1 wherein the ultrastable faujasite zeolite of a 0.5–3 microns size is distributed in a matrix material selected from; a kaolin clay-silicon oxide binder material; silica-alumina, clay, silica, alumina and a high surface area amorphous material providing active cracking sites.

4. The method of claim 1 wherein the catalyst comprises the ultrastable faujasite crystalline zeolite in an amount within the range of 30 to 50 wt. %.

5. The method of claim 1 wherein the ultrastable crystalline zeolite component of the catalyst is prepared under conditions to provide a high surface area material, a silica/alumina ratio of at least 3 and a unit cell size less than 24.65 Angstroms.

6. The method of claim 1 wherein conversion of the residual portion of the crude oil is accomplished for a time less than 3 seconds at an elevated temperature sufficient to achieve substantially instantaneous vaporization of the charged residual oil in atomized condition upon contact with high temperature catalyst particles.

7. The method of claim 6 wherein the temperature of the catalyst is at least equal to the feed pseudo-critical temperature and residual oil feed comprises metalloorganic components boiling above 1025° F.

8. The method of claim 7 wherein the catalyst elevated temperature achieved by burning hydrocarbonaceous deposits of said residual oil conversion increases in response to the feed Conradson carbon content at catalyst regeneration temperatures in the range of 1350° to 1600° F.

9. The method of claim 1 wherein the ultrastable faujasite crystalline zeolite is prepared to provide high surface area zeolite with a silica/alumina ratio of at least 5 and a unit cell size of about 24.5 Angstroms or less.

10. The method of claim 1 wherein an atomizing diluent material is used with the residual oil feed comprising one or more materials selected from steam, $CO_2$, light normally gaseous hydrocarbons comprising $C_3$ minus materials in cooperation with atomizing spray nozzles.

11. The method of claim 10 wherein the conditions are selected to insure a relatively dilute phase suspension contact between catalyst particles and atomized oil feed for vaporized conversion transfer through a riser conversion zone as a particle concentration in the range of 2 to 10 pounds per cubic foot and a vapor residence time within the range of 0.5 to 3 seconds.

12. The method of claim 1 wherein the residual oil portion of crude oil comprises high boiling Conradson carbon producing materials and metal contaminants.

13. The method of claim 1 wherein the residual oil conversion operation is effected at a temperature in the range of about 950° F. up to about 1400° F. and at a temperature equal to or above the feed pseudo-critical temperature.

14. A method for catalytically converting residual oils comprising vacuum bottoms which comprises, converting said residual oil with a catalyst consisting of about 30–50 wt. % of ultrastable faujasite crystalline zeolite dispersed in a matrix material of clay and silica binder providing active cracking sites, said catalytic conversion effected at said residual oil pseudo-critical temperature for a time in the range of 0.5 to 3 seconds in a riser reaction zone, and recovering a product selectively of said catalytic conversion particularly comprising gasoline and light cycle oils comprising largely two member rings separately from catalyst particles comprising hydrocarbonaceous deposits of said conversion.

15. The method of claim 14 wherein the separated catalyst comprising hydrocarbonaceous deposits is regenerated in a sequence of separate catalyst regeneration zones of increasing temperatures in the direction of catalyst flow permitting effecting the residual oil conversion at a temperature in the range of 950° to 1400° F.

16. The method of claim 15 wherein the sequence of catalyst regeneration steps removes residual carbon on the catalyst to below 0.25 wt. %.

17. The method of claim 14 wherein the zeolite comprises less than 0.5 wt. % $Na_2O$ and a higher surface area than a rare earth exchanged faujasite crystalline zeolite.

* * * * *